US012574476B2

(12) United States Patent
Wu

(10) Patent No.: US 12,574,476 B2
(45) Date of Patent: Mar. 10, 2026

(54) VEHICULAR VISION SYSTEM

(71) Applicant: COPLUS INC., Tainan (TW)

(72) Inventor: Po-Hua Wu, Tainan (TW)

(73) Assignee: COPLUS INC., Tainan City (TW)

( * ) Notice: Subject to any disclaimer, the term of this patent is extended or adjusted under 35 U.S.C. 154(b) by 0 days.

(21) Appl. No.: 18/896,008

(22) Filed: Sep. 25, 2024

(65) Prior Publication Data

US 2025/0379955 A1     Dec. 11, 2025

(30) Foreign Application Priority Data

Jun. 7, 2024   (TW) ................................. 113121352

(51) Int. Cl.

| | |
|---|---|
| *H04N 7/18* | (2006.01) |
| *B60R 1/12* | (2006.01) |
| *B60R 1/24* | (2022.01) |
| *B60R 1/25* | (2022.01) |
| *B60R 1/26* | (2022.01) |
| *B60R 1/28* | (2022.01) |
| *G06V 10/10* | (2022.01) |
| *G06V 20/58* | (2022.01) |
| *H04N 23/54* | (2023.01) |
| *H04N 23/90* | (2023.01) |

(52) U.S. Cl.
CPC ............... *H04N 7/181* (2013.01); *B60R 1/12* (2013.01); *B60R 1/24* (2022.01); *B60R 1/25* (2022.01); *B60R 1/26* (2022.01); *B60R 1/28* (2022.01); *G06V 20/58* (2022.01); *H04N 23/90* (2023.01); *B60R 2001/1253* (2013.01); *B60R 2300/20* (2013.01); *B60R 2300/303* (2013.01); *B60R 2300/8046* (2013.01); *B60R 2300/8093* (2013.01); *G06V 10/16* (2022.01); *H04N 23/54* (2023.01)

(58) Field of Classification Search
CPC ........ H04N 7/181; H04N 23/90; H04N 23/54; B60R 1/12; B60R 1/24; B60R 1/25; B60R 1/26; B60R 1/28; B60R 2001/1253; B60R 2300/20; B60R 2300/303; B60R 2300/8046; B60R 2300/8093; G06V 20/58; G06V 10/16
See application file for complete search history.

(56) References Cited

U.S. PATENT DOCUMENTS

| | | | | |
|---|---|---|---|---|
| 10,232,776 B2 * | 3/2019 | Mawhinney | ............. | H04N 7/18 |
| 10,501,018 B2 * | 12/2019 | Sweet | ....................... | H04N 7/18 |

(Continued)

*Primary Examiner* — Boubacar Abdou Tchoussou
(74) *Attorney, Agent, or Firm* — Burris Law, PLLC

(57) ABSTRACT

A vehicular vision system adapted to be mounted on a vehicle is provided. The vehicular vision system includes two digital side-view mirror assemblies adapted to be disposed respectively at left and right exterior sides of the vehicle, two thin-film displays adapted to be disposed respectively on front door windows of the vehicle, or respectively at a left side portion and a right side portion of a windshield of the vehicle, and a control device. Each of the digital side-view mirror assemblies includes a rear camera configured to capture a rear-side image. The control device is configured to control, one of the thin-film displays to display at least a portion of the rear-side image of one of the exterior sides of the vehicle, and another one of the thin-film displays to display at least a portion of the rear-side image of another one of the exterior sides of the vehicle.

10 Claims, 7 Drawing Sheets

(56)                    References Cited

U.S. PATENT DOCUMENTS

| | | | | |
|---|---|---|---|---|
| 10,673,013 | B2 * | 6/2020 | So | B32B 37/12 |
| 11,034,299 | B2 * | 6/2021 | Peterson | G06V 20/635 |
| 11,242,008 | B2 * | 2/2022 | Blank | B60R 1/12 |
| 11,383,653 | B2 * | 7/2022 | Shiono | B60R 1/26 |
| 11,858,424 | B2 * | 1/2024 | Shin | H04N 5/268 |
| 11,930,276 | B2 * | 3/2024 | Lee | G06V 20/58 |
| 2018/0166047 | A1 * | 6/2018 | Yamazato | G02B 27/0101 |
| 2023/0415652 | A1 * | 12/2023 | Wada | B60R 1/25 |

\* cited by examiner

VEHICULAR VISION SYSTEM

CROSS-REFERENCE TO RELATED APPLICATION

This application claims priority to Taiwanese Invention Patent application Ser. No. 113121352, filed on Jun. 7, 2024, the entire disclosure of which is incorporated by reference herein.

FIELD

The disclosure relates to a vehicular vision system, and more particularly to a vehicular vision system for providing a surround view of a vehicle.

BACKGROUND

Side-view mirrors are a basic safety feature of modern vehicles. Side-view mirrors enable a driver to see behind and along left and right exterior sides of a vehicle, so as to provide the driver with a basis for safety judgements when the driver of the vehicle intends to change lanes or make a turn. However, when a vehicle is provided with side-view mirrors, the driver has to look through the windows of the vehicle to see the images reflected respectively by the side-view mirrors. When the weather is bad, for example, when the surrounding light is dark or when it is raining, it is difficult for the driver to see the images reflected respectively by the side-view mirrors, which may easily lead to accidents.

Therefore, more and more vehicle manufacturers are replacing the side-view mirrors with a conventional digital vehicular vision system. The conventional digital vehicular vision system generally includes image capturing devices that are respectively installed on left and right exterior sides of a vehicle, and a display that is located at a center of a front portion of a passenger compartment of the vehicle. The display combines the images captured respectively by the image capturing devices into a combined image and displays the combined image that is related to a view of the surroundings of the vehicle for viewing by the driver.

However, because the display is located at the center of the front portion of the passenger compartment, this way of viewing the surroundings of the vehicle is very different from the traditional way of viewing the side-view mirrors on the left and right exterior sides of the vehicle. Many drivers will need time to adapt themselves to such a new configuration, and the length of time needed to adapt to the new configuration may vary from person to person, which may affect vehicle driving safety.

SUMMARY

Therefore, an object of the disclosure is to provide a vehicular vision system that can alleviate at least one of the drawbacks of the prior art.

According to an aspect of the disclosure, the vehicular vision system is adapted to be mounted on a vehicle. The vehicular vision system includes two digital side-view mirror assemblies, two thin-film displays, and a control device. The digital side-view mirror assemblies are adapted to be disposed respectively at left and right exterior sides of the vehicle. Each of the digital side-view mirror assemblies includes a rear camera that is configured to capture a rear-side image behind and along a corresponding one of the exterior sides of the vehicle. The thin-film displays are adapted to be arranged in one of a first manner that the thin-film displays are disposed respectively on front door windows of the vehicle, and a second manner that the thin-film displays are disposed respectively at a left side portion and a right side portion of a windshield of the vehicle. The control device is communicatively connected to the digital side-view mirror assemblies and the thin-film displays. The control device is configured to control one of the thin-film displays to display at least a portion of the rear-side image that is along a corresponding one of the exterior sides of the vehicle, and to control another one of the thin-film displays to display at least a portion of the rear-side image that is along another one of the exterior sides of the vehicle.

According to another aspect of the disclosure, the vehicular vision system is adapted to be mounted on a vehicle. The vehicular vision system includes two digital side-view mirror assemblies, two projectors, and a control device. The digital side-view mirror assemblies are adapted to be disposed respectively at left and right exterior sides of the vehicle. Each of the digital side-view mirror assemblies includes a rear camera that is configured to capture a rear-side image behind and along a corresponding one of the exterior sides of the vehicle. The projectors are spaced apart from each other, and are adapted to be disposed respectively at left and right portions of a passenger compartment of the vehicle. Each of the projectors is configured to project an image onto an inner surface of the passenger compartment of the vehicle. The control device is communicatively connected to the digital side-view mirror assemblies and the projectors. The control device is configured to control one of the projectors to project at least a portion of the rear-side image that is along a corresponding one of the exterior sides of the vehicle, and to control another one of the projectors to project at least a portion of the rear-side image that is along another one of the exterior sides of the vehicle.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
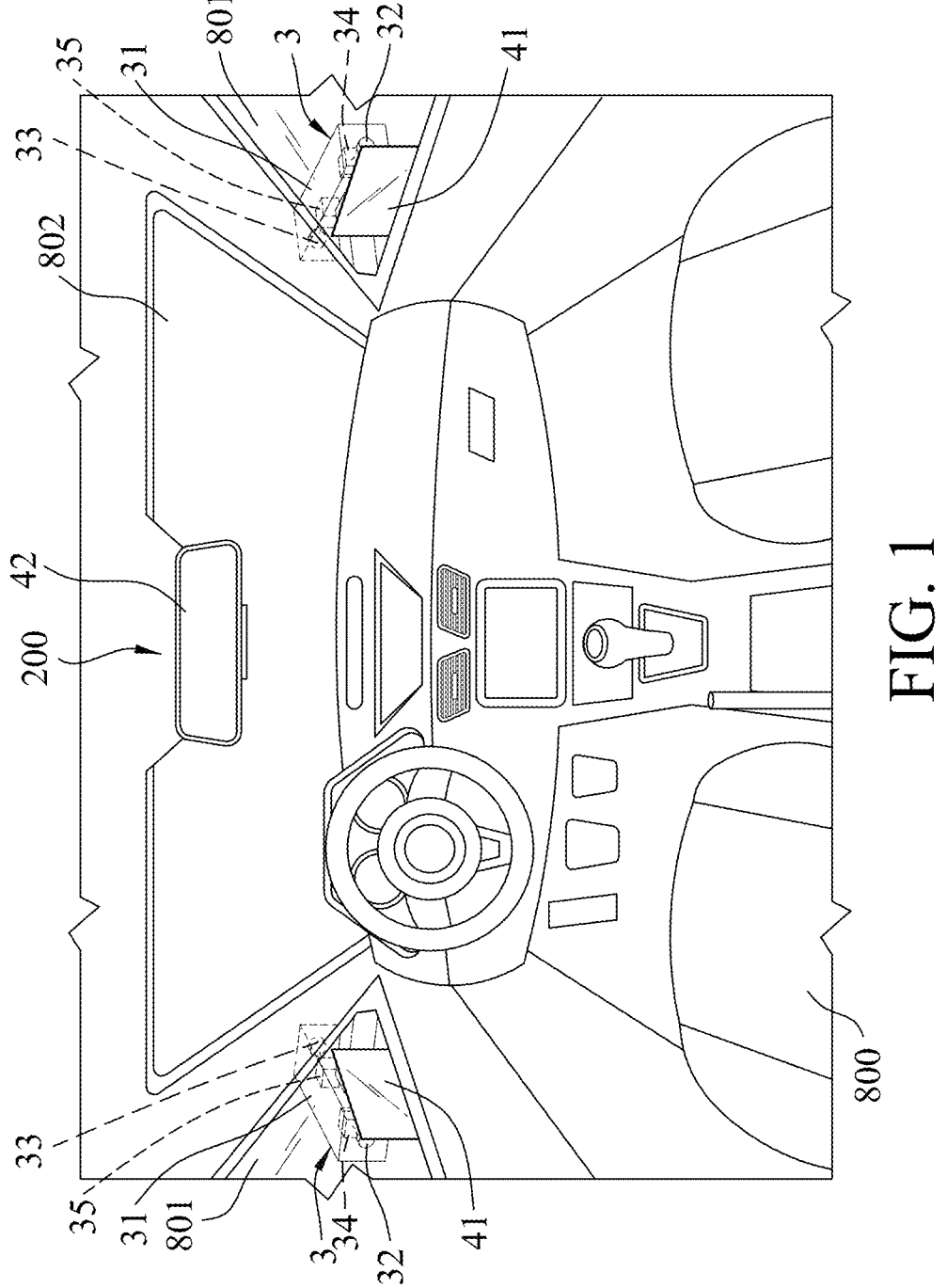
FIG. 1 is a fragmentary perspective view of a passenger compartment of a vehicle, for illustrating a vehicular vision system mounted on the vehicle according to a first embodiment of the present disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 2:
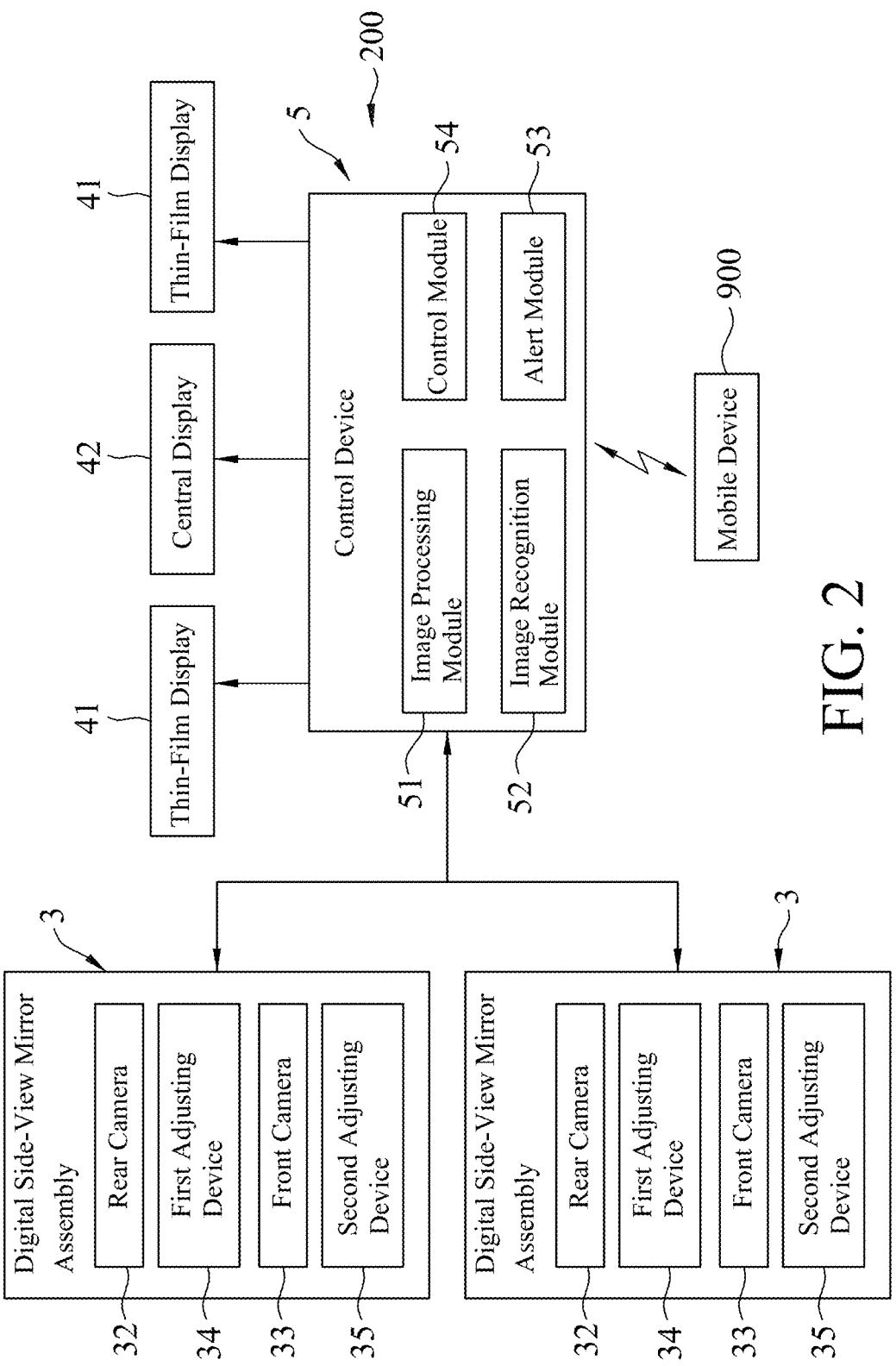
FIG. 2 is a block diagram of the vehicular vision system according to the first embodiment of the present disclosure.
Figure 3:
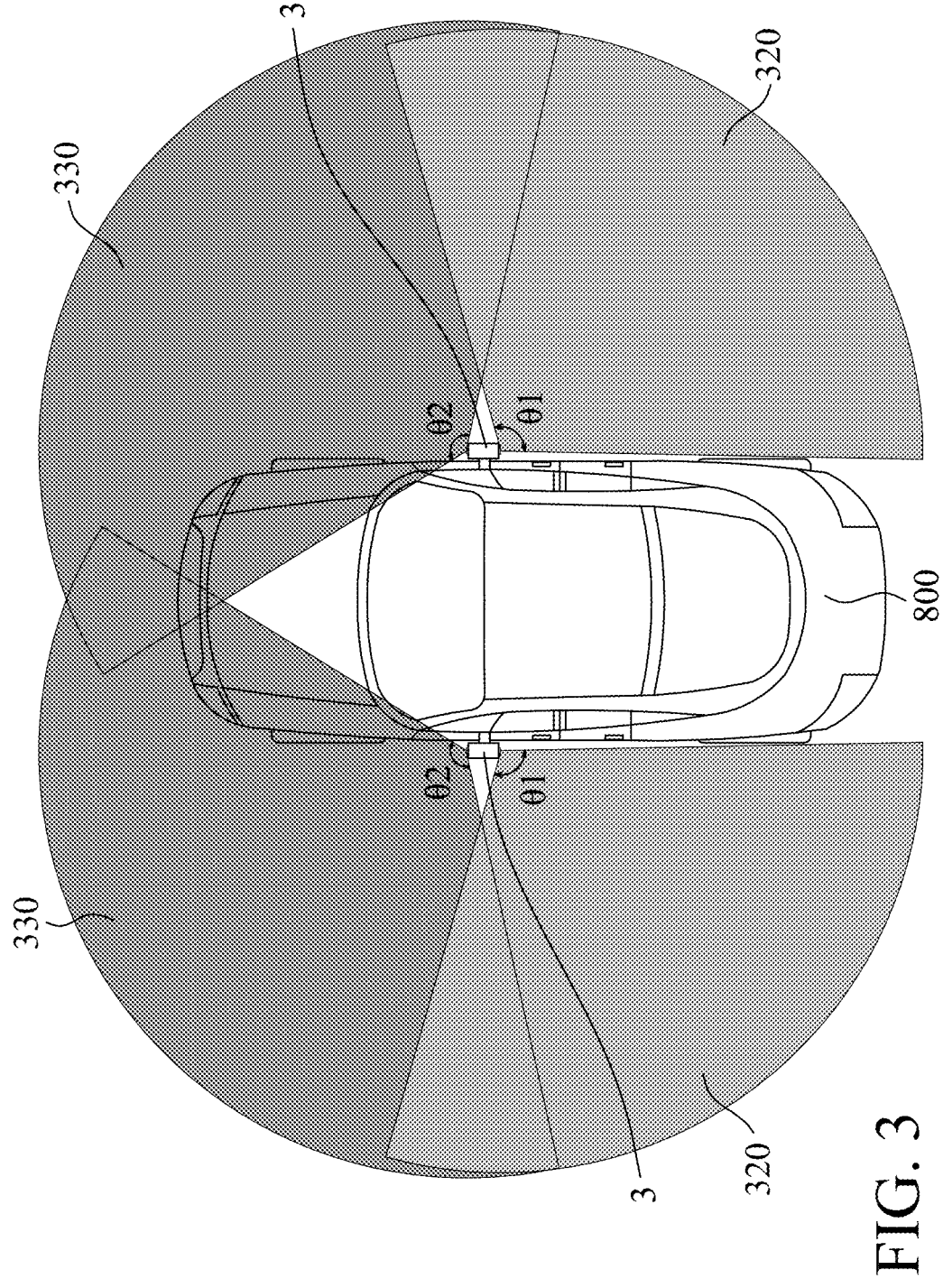
FIG. 3 is a top view illustrating fields of view respectively of rear cameras and front cameras of the vehicular vision system according to an embodiment of the present disclosure.

Referring to FIGS. 1 to 3, a first embodiment of a vehicular vision system 200 according to the present disclosure is provided. In this embodiment, the vehicular vision system 200 is mounted on a vehicle 800 (e.g., a car), and is communicatively connected to a mobile device 900 for receiving an angle adjustment signal therefrom. The vehicular vision system 200 may be electrically connected to the mobile device 900 through a wire, or wirelessly connected to the mobile device 900 through wireless communication technique such as Bluetooth®.

The vehicular vision system 200 includes two digital side-view mirror assemblies 3 adapted to be disposed respectively at left and right exterior sides of the vehicle 800, two thin-film displays 41 disposed in a passenger compartment of the vehicle 800 and spaced apart from each other, a central display 42 adapted to be disposed at a front portion of the passenger compartment of the vehicle 800 between the thin-film displays 41, and a control device 5. The control device 5 may be embodied using an electronic device that includes, for example, a central processing unit (CPU). The control device 5 is communicatively connected to the digital side-view mirror assemblies 3, the thin-film displays 41, and the central display 42, and is configured to receive the angle adjustment signal from the mobile device 900.

Each of the digital side-view mirror assemblies 3 includes a body 31 adapted to be mounted on the vehicle 800. In this embodiment, the body 31 has a rear side that is facing rearward of the vehicle 800, and a front side that is facing forward of the vehicle 800. Each of the digital side-view mirror assemblies 3 further includes a rear camera 32 disposed at the rear side of the body 31, a front camera 33 disposed at the front side of the body 31, and a first adjusting device 34 and a second adjusting device 35 disposed on the body 31 and respectively connected to the rear camera 32 and the front camera 33.

Referring to FIG. 3, the rear camera 32 of each of the digital side-view mirror assemblies 3 has a first horizontal angle of view (AOV) ($\theta 1$), and is configured to capture a rear-side image behind and along a corresponding one of the exterior sides of the vehicle 800. The first horizontal AOV ($\theta 1$) may be, for example, 120 degrees or 150 degrees, but is not limited to these values. The front camera 33 of each of the digital side-view mirror assemblies 3 has a second horizontal AOV ($\theta 2$), and is configured to capture a front image in front of the vehicle 800. The second horizontal AOV ($\theta 2$) may be, for example, 120 degrees or 150 degrees, but is not limited to these values. The rear camera 32 and the front camera 33 may be embodied using, for example, charge coupled device (CCD) sensors or complementary metal oxide semiconductor (CMOS) imaging array sensors; however, the rear camera 32 and the front camera 32 are not limited to these examples.

The rear cameras 32 respectively of the digital side-view mirror assemblies 3 each have a rear horizontal field of view (FOV) 320. The front cameras 33 respectively of the digital side-view mirror assemblies 3 each have a front horizontal FOV 330. In this embodiment, for each of the digital side-view mirror assemblies 3, the rear horizontal FOV 320 of the rear camera 32 overlaps the front horizontal FOV 330 of the front camera 33. The horizontal FOVs 330 respectively of the front cameras 33 overlap, resulting in the front images captured respectively by the front cameras 33 to have an overlapping portion.

For each of the digital side-view mirror assemblies 3, the first adjusting device 34 is disposed on the body 31 for adjusting a viewing direction of the rear camera 32. Specifically, the first adjusting device 34 is operable to perform a first adjusting operation (i.e., rotating the rear camera 32, so as to swivel the rear camera 32 in up, down, left, and right directions with respect to the body 31). The second adjusting device 35 is disposed on the body 31 for adjusting a viewing direction of the front camera 33. Specifically, the second adjusting device 35 is operable to perform a second adjusting operation (i.e., rotating the front camera 33, so as to swivel the front camera 33 in the up, down, left, and right directions with respect to the body 31). For example, each of the first adjusting device 34 and the second adjusting device 35 includes a motor (not shown), and a gear transmission mechanism (not shown) connected between the motor and a corresponding one of the rear camera 32 and the front camera 33. Ways in which the first adjusting operation and the second adjusting operation may be performed are many, are well known in the art, and are not the focus of the present disclosure. Therefore, further descriptions on how the first adjusting device 34 and the second adjusting device 35 adjust the viewing directions of the rear camera 32 and the front camera 33 will be omitted hereinafter for the sake of brevity.

The vehicle 800 has left and right front doors, and the thin-film displays 41 are disposed respectively on front door windows 801 respectively of the left and right front doors of the vehicle 800. Specifically, each of the thin-film displays 41 is disposed on an inner surface of the corresponding one of the front door windows 801. Each of the thin-film displays 41 may be embodied as, for example, but is not limited to, a thin film transistor liquid crystal display (TFT-LCD) or a thin film diode display (TFD).

In this embodiment, the thin-film displays 41 are adhered respectively onto the inner surfaces of the respective front door windows 801. In some embodiments, the thin-film displays 41 each include a display surface, and the thin-film displays 41 may be embedded respectively in the front door windows 801, in a manner that the display surfaces respectively of the thin-film displays 41 are flush with the inner surfaces of the front door windows 801. In other embodiments, the thin-film displays 41 may be embedded respectively within the front door windows 801.

Figure 4:
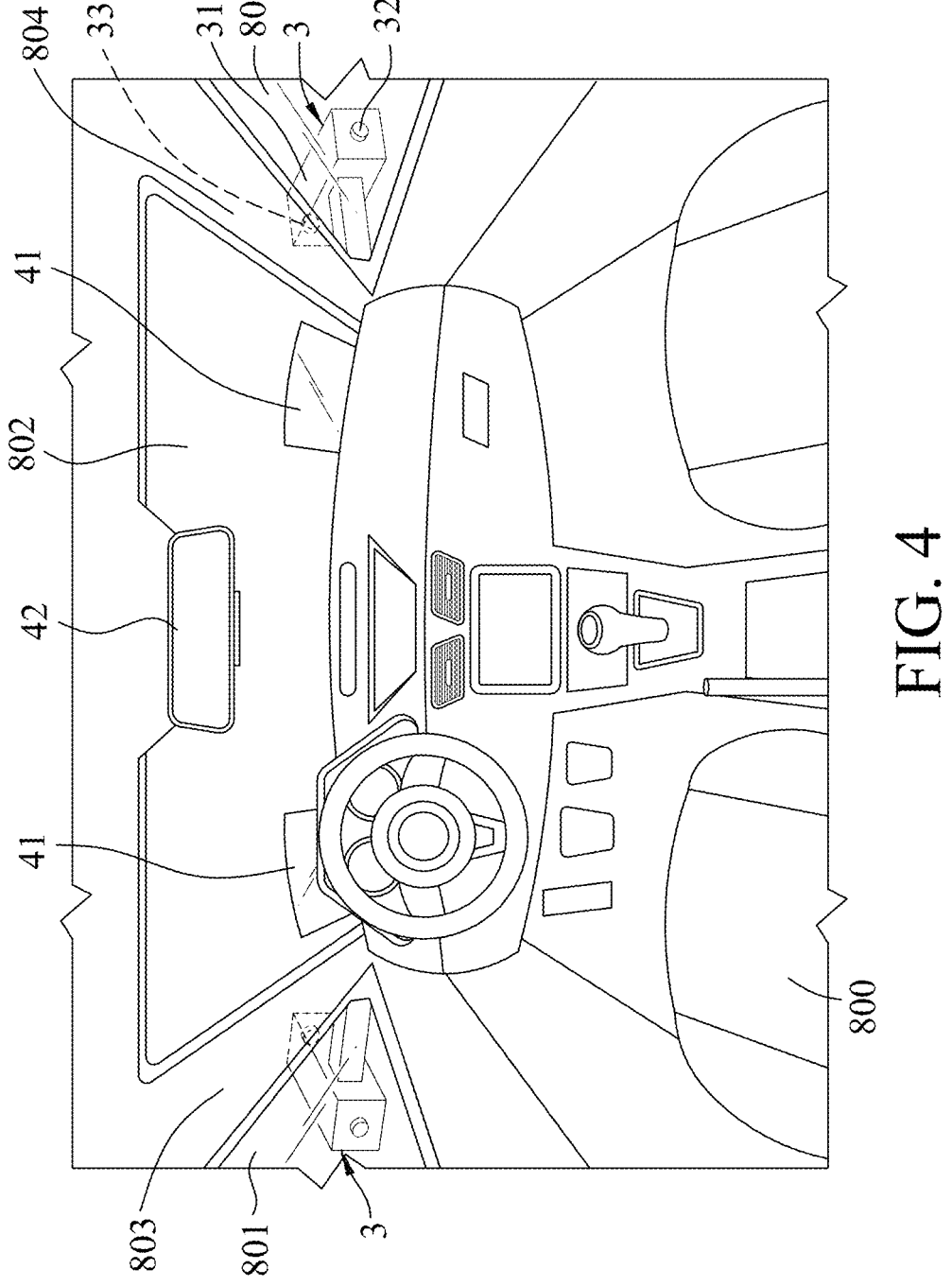
FIG. 4 is a fragmentary perspective view of a passenger compartment, for illustrating a variation of the vehicular vision system of the first embodiment mounted on a vehicle.

Referring to FIG. 4, a variation of the first embodiment of the vehicular vision system 200 according to the present disclosure is provided. In this variation, the thin-film displays 41 are disposed respectively at a left side portion and a right side portion of a windshield 802 of the vehicle 800. Specifically, the thin-film displays 41 are disposed on an inner surface of the windshield 802, and are located adjacent to A-pillars 803, 804 of the vehicle 800, respectively.

In the first embodiment shown in FIGS. 1 and 4, the central display 42 is disposed in a center of the front portion of the passenger compartment. The central display 42 may be embodied as, for example, a liquid crystal display (LCD); however, the central display 42 is not thus limited. In this embodiment, the central display 42 is integrated with a rear-view mirror of the vehicle 800.

Referring to FIG. 2, the control device 5 includes an image processing module 51, an image recognition module 52, an alert module 53, and a control module 54.

The image processing module 51 is configured to perform image processing on the rear-side image captured by the rear camera 32 to capture a rearview image from the rear-side image, and to transmit the rearview image to the control module 54. In this embodiment, the rearview image has a horizontal AOV that is smaller than the horizontal AOV of the rear camera 32. The image processing module 51 is further configured to perform image processing on the overlapping portion of the front images to obtain two front-view images that are able to be seamlessly integrated with each other when connected side by side, and to transmit the front-view images to the control module 54. Methods of performing image processing on the overlapping portion of the front images to obtain the two front-view images that are able to be seamlessly integrated with each other are well known in the art (e.g., using image alignment techniques and blending techniques). Therefore, further descriptions on the methods of performing image processing on the overlapping portion of the front images will be omitted hereinafter for the sake of brevity.

The image recognition module 52 is configured to perform image analysis by using, for example, an image recognition technique, on the front images, and to generate an obstacle alert signal when the image recognition module 52 determines a presence of an obstacle (e.g., a person, an object, a nearby vehicle, etc.) within a predetermined distance from the vehicle 800. Specifically, in this embodiment, the image recognition module 52 obtains an obstacle image that is related to a detected obstacle from at least one of the front images, and then calculates an obstacle distance between the vehicle 800 and the detected obstacle based on a position and a size of the obstacle image with respect to the at least one of the front images, from which the obstacle image is obtained. The image recognition module 52 then determines whether the obstacle distance is within the predetermined distance from the vehicle 800, and generates the obstacle alert signal if the determination is affirmative.

The image recognition module 52 is further configured to perform image analysis on the front images to obtain a front vehicle image related to a front vehicle that is in front of the vehicle 800 from at least one of the front images. In this embodiment, the image recognition module 52 calculates a front vehicle separation distance between the vehicle 800 and the front vehicle based on a position and a size of the front vehicle image with respect to the at least one of the front images, from which the front vehicle image is obtained. The image recognition module 52 then generates and transmits a distance alert signal to the control module 54 when the image recognition module 52 determines that the front vehicle separation distance between the vehicle 800 and the front vehicle is smaller than a predetermined value.

The image recognition technique mentioned above may include, but is not limited to, grayscale conversion, binarization, and contour detection for detecting the outline of an object in order to obtain an object image. The object image is then analyzed based on an image recognition model trained in advance using an algorithm to determine a type of the object (e.g., determining whether the object is an obstacle or a vehicle). The algorithm may be, for example, but is not limited to, computer vision programming such as artificial intelligence (AI) and machine learning (ML). Since there are many types of image recognition techniques, and they are not the focus of the present disclosure, further descriptions thereof will be omitted for the sake of brevity.

In this embodiment, the alert module 53 is disposed in the passenger compartment. The alert module 53 is configured to output an obstacle alert message indicating presence of an obstacle in front of the vehicle 800, and a distance alert message indicating that the front vehicle separation distance is too short. The obstacle alert message and the distance alert message may be exemplified as sounds, blinking lights, and/or images. In some embodiments, the alert module 53 may be integrated with the central display 42.

The control module 54 is configured to control the thin-film displays 41 to respectively display the rearview images captured respectively from the rear-side images that are respectively captured by the rear cameras 32 of the digital side-view mirror assemblies. That is to say, a left one of the thin-film displays 41 that is disposed at a left side of the vehicle 800 (i.e., on the inner surface of a left one of the front door windows 801 or on the left side portion of the windshield 802) is configured to display one of the rearview images related to the rear-side image that is along the left exterior side of the vehicle 800 and that is captured by the rear camera 32 of one of the digital side-view mirror assemblies 3 disposed at the left exterior side of the vehicle 800; a right one of the thin-film displays 41 that is disposed at a right side of the vehicle 800 (i.e., on the inner surface of a right one of the front door windows 801 or on the right side portion of the windshield 802) is configured to display the other one of the rearview images related to the rear-side image that is along the right exterior side of the vehicle 800 and that is captured by the rear camera 32 of the other one of the digital side-view mirror assemblies 3 disposed at the right exterior side of the vehicle 800. In some embodiments, the control module 54 is further configured to control the central display 42 to display the front-view images that are arranged side by side and that are related respectively to the front images captured respectively by the front cameras 33 of the digital side-view mirror assemblies 3.

The control module 54 is further configured to, in response to receipt of the obstacle alert signal, control the alert module 53 to output the obstacle alert message to indicate that there is an obstacle in front of the vehicle 800, and, in response to receipt of the distance alert signal, control the alert module 53 to output the distance alert message to indicate that the front vehicle separation distance between the vehicle 800 and the front vehicle is too short (i.e., the front vehicle separation distance is smaller than the predetermined value).

In this embodiment, the control module 54 is further configured to receive the angle adjustment signal from the mobile device 900. In response to receipt of the angle adjustment signal, the control module 54 controls the first adjusting device 34 of one of the digital side-view mirror assemblies 3 to perform the first adjusting operation, and/or the second adjusting device 35 of one of the digital side-view mirror assemblies 3 to perform the second adjusting operation according to the angle adjustment signal.

Figure 5:
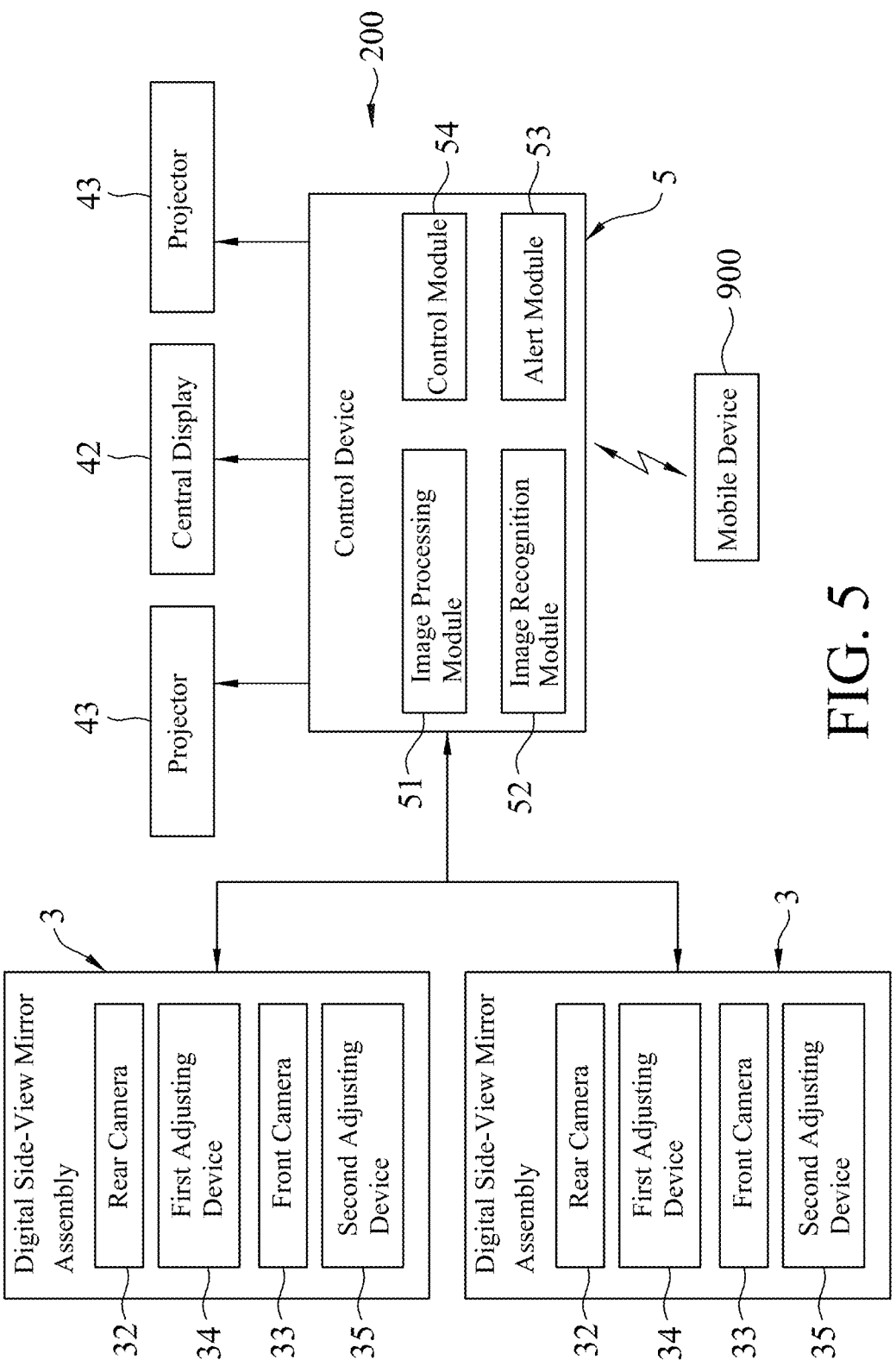
FIG. 5 is a block diagram of the vehicular vision system according to a second embodiment of the present disclosure.
Figure 6:
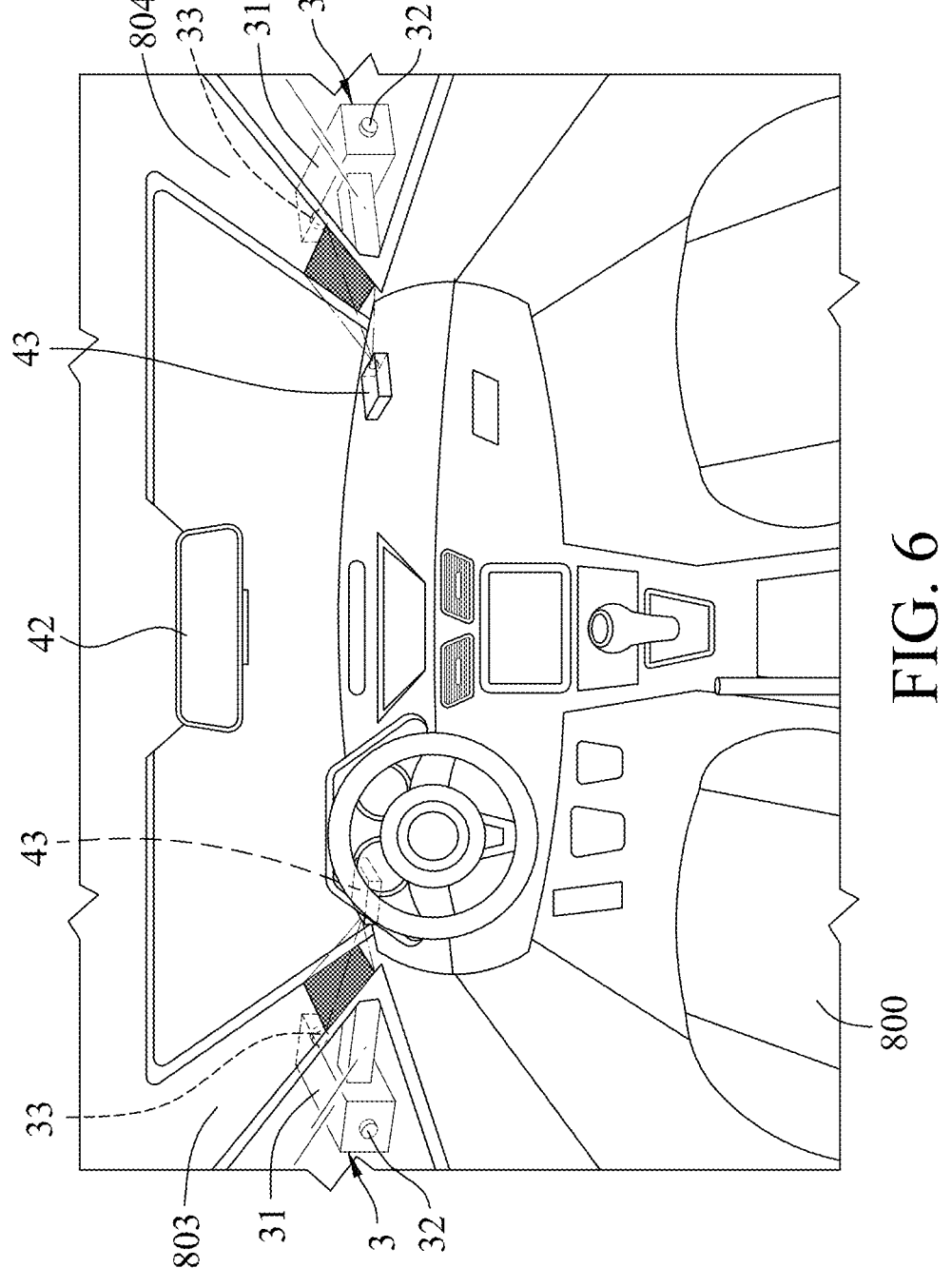
FIG. 6 is a fragmentary perspective view of a passenger compartment, for illustrating the vehicular vision system mounted on a vehicle according to the second embodiment of the present disclosure.

Referring to FIGS. 5 and 6, a second embodiment of the vehicular vision system 200 according to the present disclosure is provided. The second embodiment differs from the first embodiment in that two projectors 43 are used instead of the thin-film displays 41. For the sake of brevity, only aspects of the second embodiment that are different from the first embodiment will be illustrated hereinafter.

Figure 7:
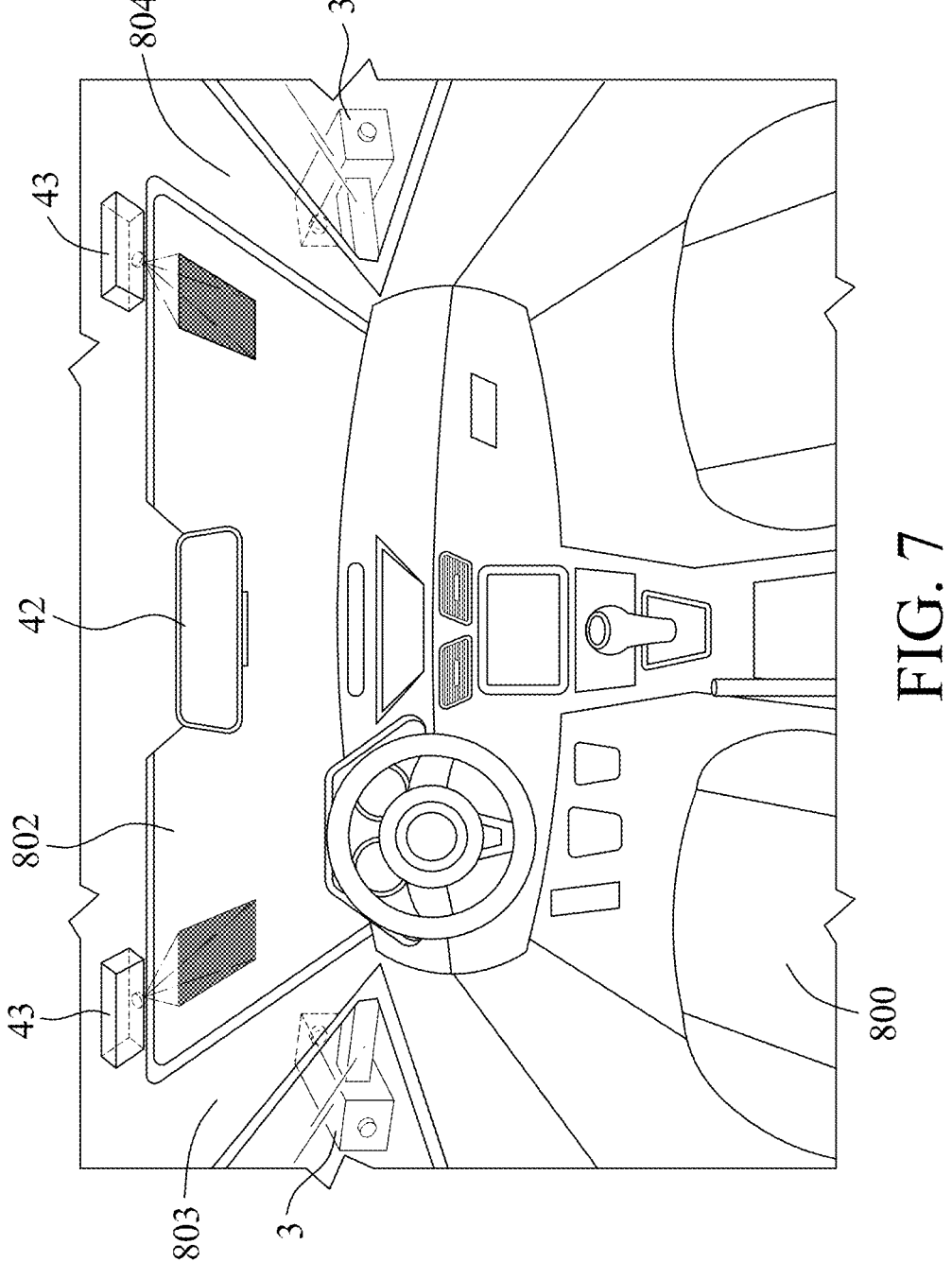
FIG. 7 is a fragmentary perspective view of a passenger compartment, for illustrating a variation of the vehicular vision system of the second embodiment mounted on a vehicle.

In the second embodiment, the projectors 43 are disposed respectively at left and right portions of the passenger compartment of the vehicle 800. The control module 54 is configured to control each of the projectors 43 to project an image onto an inner surface of the passenger compartment of the vehicle 800. Specifically, one of the projectors 43 is disposed on a dashboard of the vehicle 800 and is close to a left one of the A-pillars 803, and the other one of the projectors 43 is disposed above a glove compartment of the vehicle 800 and is close to a right one of the A-pillars 804; the control module 54 controls the projectors 43 to respectively project the rearview images that are related respectively to the rear-side images respectively captured by the rear cameras 32 of the digital side-view mirror assemblies 3 onto the A-pillars 803, 804, respectively. In a variation of the second embodiment as shown in FIG. 7, the projectors 43 are disposed respectively at right and left positions above the windshield 802, and the projectors 43 are controlled to respectively project the rearview images onto the left side portion and the right side portion of the windshield 802 of the vehicle 800.

In the embodiments mentioned above, the image processing module 51 performs image processing on the rear-side images to capture the rearview images from the rear-side images. After that, the control module 54 controls the thin-film displays 41 to respectively display the rearview images, or controls the projectors 43 to respectively project the rearview images. In some embodiments, the control module 54 may instead control the thin-film displays 41 to respectively display the rear-side images directly, or control the projectors 43 to respectively project the rear-side images directly. Additionally, in some embodiments, the control module 54 may control the central display 42 to display the front images side by side.

In summary, the thin-film displays 41 are disposed respectively on the front door windows 801 of the vehicle 800, or respectively at the left side portion and the right side portion of the windshield 802 of the vehicle. The projectors 43 respectively project the rearview images respectively onto the A-pillars 803, 804, or respectively onto the left side portion and the right side portion of the windshield 802. By virtue of the above arrangements, a driver is able to view the oncoming traffic on the left and right exterior sides of the vehicle 800 in a manner similar to conventional rearview mirror viewing habits, thereby may improve driving safety.

In addition, the control device 5 is able to perform image analysis on the front images. Through the image analysis, the control device 5 is able to determine the presence of an obstacle in front of the vehicle 800, and to determine whether the front vehicle separation distance between the vehicle 800 and a front vehicle is smaller than a predetermined value. By virtue of this configuration, the driving safety of the vehicle 800 is further enhanced.

Furthermore, the control device 5 is able to receive the angle adjustment signal from the mobile device 900 in order to control the first adjusting device 34, or to control the second adjusting device 35. By virtue of this configuration, the driver is able to use the mobile device 900 to easily adjust the viewing directions of the rear camera 32 and the front camera 33 of each of the digital side-view mirror assemblies 3.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A vehicular vision system adapted to be mounted on a vehicle, said vehicular vision system comprising:

two digital side-view mirror assemblies adapted to be disposed respectively at left and right exterior sides of the vehicle, each of said digital side-view mirror assemblies including a front camera that is configured to capture a front image in front of the vehicle, and a rear camera that is configured to capture a rear-side image behind and along a corresponding one of the exterior sides of the vehicle;

two thin-film displays adapted to be arranged in one of a first manner that said thin-film displays are disposed respectively on front door windows of the vehicle, and a second manner that said thin-film displays are disposed respectively at a left side portion and a right side portion of a windshield of the vehicle;

a central display adapted to be disposed at a front portion of a passenger compartment of the vehicle between said thin-film displays; and a control device communicatively connected to said digital side-view mirror assemblies and said thin-film displays, and configured to control one of said thin-film displays to display at least a portion of the rear-side image that is along the corresponding one of the exterior sides of the vehicle and to control another one of said thin-film displays to display at least a portion of the rear-side image that is along another one of the exterior sides of the vehicle, wherein said control device is further configured to control said central display to display two front-view images that are arranged side by side and that are related respectively to the front images captured respectively by said front cameras of said digital side-view mirror assemblies, each of the front-view images including at least a portion of the corresponding one of the front images, wherein each of said front cameras has a horizontal field of view (FOV), and the horizontal fields of view (FOVs) respectively of said front cameras overlap, causing the front images captured by said front cameras to have an overlapping portion, and wherein said control device includes an image processing module and a control module, said image processing module being configured to perform image processing on the overlapping portion of the front images to obtain the front-view images that are able to be seamlessly integrated with each other when connected side by side, said control module being configured to control said central display to display the front-view images side by side.

2. The vehicular vision system as claimed in claim 1, wherein each of said digital side-view mirror assemblies further includes a body adapted to be mounted on the vehicle, a first adjusting device disposed on said body and connected to said rear camera for adjusting a viewing direction of said rear camera, and a second adjusting device disposed on said body and connected to said front camera for adjusting a viewing direction of said front camera, wherein said control module is further configured to communicate with a mobile device for receiving an angle adjustment signal therefrom, and, in response to receipt of the angle adjustment signal, perform one of a first adjustment to control said first adjusting device to adjust the viewing direction of said rear camera according to the angle adjustment signal thus received, and a second adjustment to control said second adjusting device to adjust the viewing direction of said front camera according to the angle adjustment signal thus received.

3. The vehicular vision system as claimed in claim 1, wherein said control device further includes an alert module, and an image recognition module configured to perform image analysis on the front images and to generate an obstacle alert signal when said image recognition module determines presence of an obstacle within a predetermined distance from the vehicle, and said control module is configured to, in response to receiving the obstacle alert signal, control said alert module to output an obstacle alert message indicating the presence of an obstacle in front of the vehicle.

4. The vehicular vision system as claimed in claim 3, wherein said image recognition module is further configured to:

perform image analysis on the front images to obtain a front vehicle image related to a front vehicle from at least one of the front images;

calculate a front vehicle separation distance between the vehicle and the front vehicle based on a position and a size of the front vehicle image with respect to the at least one of the front images, from which the front vehicle image was obtained; and generate and transmit a distance alert signal to said control module when said image recognition module determines that the front vehicle separation distance between the vehicle and the front vehicle is smaller than a predetermined value, and wherein said control module is configured to, in response to receiving the distance alert signal, control said alert module to output a distance alert message.

5. The vehicular vision system as claimed in claim 1, wherein said rear camera has a horizontal angle of view (AOV);

wherein said image processing module is further configured to perform image processing on the rear-side image to capture a rearview image from the rear-side image, the rearview image having a horizontal AOV smaller than the horizontal AOV of said rear camera; and wherein said control module is further configured to control said thin-film displays to respectively display the rearview images that are related respectively to the rear-side images respectively captured by said rear cameras respectively of said digital side-view mirror assemblies.

6. A vehicular vision system adapted to be mounted on a vehicle, said vehicular vision system comprising:

two digital side-view mirror assemblies adapted to be disposed respectively at left and right exterior sides of the vehicle, each of said digital side-view mirror assemblies including a front camera that is configured to capture a front image in front of the vehicle, and a rear camera that is configured to capture a rear-side image behind and along a corresponding one of the exterior sides of the vehicle;

two projectors spaced apart from each other, and adapted to be disposed respectively at left and right portions of a passenger compartment of the vehicle, each of said projectors being configured to project an image onto an inner surface of the passenger compartment of the vehicle;

a central display adapted to be disposed at a front portion of a passenger compartment of the vehicle between said projectors; and a control device communicatively connected to said digital side-view mirror assemblies and said projectors, and configured to control one of said projectors to project at least a portion of the rear-side image that is along the corresponding one of the exterior sides of the vehicle and to control another one of said projectors to project at least a portion of the rear-side image that is along another one of the exterior sides of the vehicle, wherein said control device is further configured to control said central display to display two front-view images that are arranged side by side and that are related respectively to the front images captured respectively by said front cameras respectively of said digital side-view mirror assemblies, each of the front-view images including at least a portion of the corresponding one of the front images, wherein each of said front cameras has a horizontal field of view (FOV), and the horizontal fields of view (FOVs) respectively of said front cameras overlap, causing the front images captured by said front cameras to have an overlapping portion, and wherein said control device includes an image processing module and a control module, said image processing module being configured to perform image processing on the overlapping portion of the front images to obtain the front-view images that are to be seamlessly integrated with each other when connected side by side, said control module being configured to control said central display to display the front-view images side by side.

7. The vehicular vision system as claimed in claim 6, wherein each of said digital side-view mirror assemblies further includes a body adapted to be mounted on the vehicle, a first adjusting device disposed on said body and connected to said rear camera for adjusting a viewing direction of said rear camera, and a second adjusting device disposed on said body and connected to said front camera for adjusting a viewing direction of said front camera, wherein said control module is further configured to communicate with a mobile device for receiving an angle adjustment signal therefrom, and, in response to receipt of the angle adjustment signal, perform one of a first adjustment to control said first adjusting device to adjust the viewing direction of said rear camera according to the angle adjustment signal thus received, and a second adjustment to control said second adjusting device to adjust the viewing direction of said front camera according to the angle adjustment signal thus received.

8. The vehicular vision system as claimed in claim 6, wherein said control device further includes an alert module, and an image recognition module configured to perform image analysis on the front images and to generate an obstacle alert signal when said image recognition module determines presence of an obstacle within a predetermined distance from the vehicle, and said control module is configured to, in response to receiving the obstacle alert signal, control said alert module to output an obstacle alert message indicating the presence of an obstacle in front of the vehicle.

9. The vehicular vision system as claimed in claim 8, wherein said image recognition module is further configured to:

perform image analysis on the front images to obtain a front vehicle image related to a front vehicle from at least one of the front images;

calculate a front vehicle separation distance between the vehicle and the front vehicle based on a position and a size of the front vehicle image with respect to the at least one of the front images, from which the front vehicle image was obtained; and generate and transmit a distance alert signal to said control module when said image recognition module determines that the front vehicle separation distance between the vehicle and the front vehicle is smaller than a predetermined value, and wherein said control module is configured to, in response to receiving the distance alert signal, control said alert module to output a distance alert message.

10. The vehicular vision system as claimed in claim 6, wherein said rear camera has a horizontal angle of view (AOV);

wherein said image processing module is further configured to perform image processing on the rear-side image to capture a rearview image from the rear-side image, the rearview image having a horizontal AOV smaller than the horizontal AOV of said rear camera; and wherein said control module is further configured to control said projectors to respectively project the rearview images that are related respectively to the rear-side images respectively captured by said rear cameras respectively of said digital side-view mirror assemblies.

\* \* \* \* \*